O. G. HOWES.

Planing-Machine.

No. 6,412.

Reissued May 4, 1875.

*WITNESSES*

Wm. Frank Browne

E. McGallaher

*INVENTOR*

Orson G. Howes by Wm. R. Norris his

Attorney

THE GRAPHIC CO. PHOTO-LITH. 39 & 41 PARK PLACE, N.Y.

UNITED STATES PATENT OFFICE.

ORSON G. HOWES, OF FORT ANN, NEW YORK, ASSIGNOR OF ONE-HALF INTEREST TO WILLIAM R. NORRIS, OF SAME PLACE.

IMPROVEMENT IN PLANING-MACHINES.

Specification forming part of Letters Patent No. 149,128, dated March 31, 1874; reissue No. 6,412, dated May 4, 1875; application filed April 16, 1875.

*To all whom it may concern:*

Be it known that I, ORSON G. HOWES, of Fort Ann, county of Washington and State of New York, have invented a new and useful Improvement in Planing-Machines, especially adapted to dressing the sides of doors and other frame-work of like construction; and I do hereby declare that the following is a full and exact description thereof, reference being had to the accompanying drawings, making a part of this specification.

Figure 1:
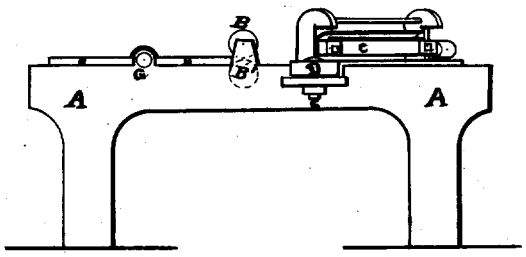
Figure 2:
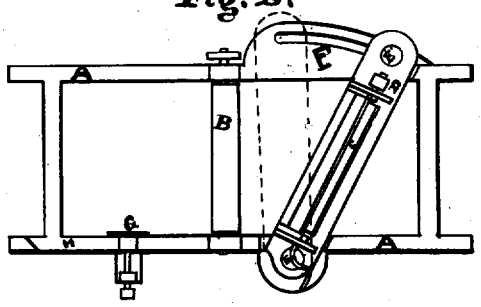
Figure 3:
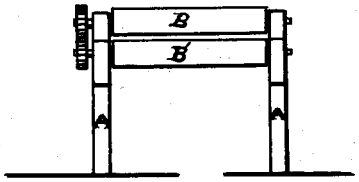

Figure 1 is a side elevation of a planing-machine. Fig. 2 is a plan of the same. Fig. 3 is a cross-section, showing two feed-rolls.

Similar letters refer to corresponding parts in all the figures.

The invention relates to an improvement in planing-machines, especially adapted to planing wood, paneled doors, and other frame-work of like construction, while they are in the process of manufacture; and consists in the employment of an unyielding bed, in connection with a revolving cutter-head, secured at any angle other than a right angle to the sides of the machine that may be required by the character of the frame-work to be dressed.

In the construction of the machine I employ a cast-iron frame, A, similar to those ordinarily used. To the sides I cast projections, as seen in Fig. 2. In one projection I make a slot, F, the length of which determines the swing of the cutter-head and bed desired. The bolts E E′ pass through the projections, so as to admit of nuts being screwed upon them. D represents the bed, to which the cutter-head is secured by appropriate standards and boxes, and operated as in ordinary machines. The bed D is secured at one end by the bolt E, and at the other by the bolt E′, which passes through the slot F, and is held firmly in position by tightening the nut on the under side of the projection, thus securing the cutter-head at the angle required. B B′ are two feed-rolls, mounted on the frame, and operated in the usual manner. G is a mandrel and saw. Their use is to cut wedges and other projections from the edge of the door as it passes through the machine.

The object of placing the cutter-head in the position shown in Fig. 2, or some other oblique position, is that, when so operated, the knives will cut the wood in the different pieces of which the door is composed without producing a rough surface or splitting off unsupported corners; and when used in connection with the unyielding bed, which keeps the door in an unvarying horizontal line, a surface is produced entirely free from undulations, ridges, and other roughness, such as is produced by machines having moving beds.

By experience I find that in planing ordinary pine doors I secure the best results by placing the cutter-head and bed at an angle of about thirty-one degrees, while in planing other articles of different construction and timber other angles are preferable.

What I desire to secure by Letters Patent is—

The cutter-head C, attached to the bed, as shown and described, in combination with the frame A of a planing-machine, as and for the purposes herein specified.

ORSON G. HOWES.

Witnesses:

LYMAN HALL,

I. J. FINCH.